US 7,660,306 B1

(12) United States Patent
Eiriksson et al.

(10) Patent No.: US 7,660,306 B1
(45) Date of Patent: Feb. 9, 2010

(54) VIRTUALIZING THE OPERATION OF INTELLIGENT NETWORK INTERFACE CIRCUITRY

(75) Inventors: Asgeir Thor Eiriksson, Sunnyvale, CA (US); Dimitrios Michailidis, Sunnyvale, CA (US); Wael Noureddine, Mountain View, CA (US)

(73) Assignee: Chelsio Communications, Inc., Sunnyvale, CA (US)

( * ) Notice: Subject to any disclaimer, the term of this patent is extended or adjusted under 35 U.S.C. 154(b) by 494 days.

(21) Appl. No.: 11/330,898

(22) Filed: Jan. 12, 2006

(51) Int. Cl.
*H04L 12/28* (2006.01)
*H04J 3/16* (2006.01)
(52) U.S. Cl. .................... 370/392; 370/401; 370/469
(58) Field of Classification Search .................. 370/389, 370/392, 400, 401, 412, 469
See application file for complete search history.

(56) References Cited

U.S. PATENT DOCUMENTS

| 4,445,116 | A | 4/1984 | Grow |
| 4,533,996 | A | 8/1985 | Hartung et al. |
| 5,497,476 | A | 3/1996 | Oldfield et al. |
| 6,087,581 | A | 7/2000 | Emmer et al. |
| 6,226,680 | B1 | 5/2001 | Boucher et al. ............. 709/230 |
| 6,240,094 | B1 | 5/2001 | Schneider |
| 6,247,060 | B1 | 6/2001 | Boucher et al. ............. 709/238 |
| 6,334,153 | B2 | 12/2001 | Boucher et al. ............. 709/230 |
| 6,389,479 | B1 | 5/2002 | Boucher et al. ............. 709/243 |
| 6,393,487 | B2 | 5/2002 | Boucher et al. ............. 709/238 |
| 6,397,316 | B2 | 5/2002 | Fesas, Jr. |
| 6,401,177 | B1 | 6/2002 | Koike |
| 6,427,171 | B1 | 7/2002 | Craft et al. ............. 709/230 |
| 6,427,173 | B1 | 7/2002 | Boucher et al. ............. 709/238 |
| 6,434,620 | B1 | 8/2002 | Boucher et al. ............. 709/230 |
| 6,470,415 | B1 | 10/2002 | Starr et al. ............. 711/104 |
| 6,510,164 | B1 | 1/2003 | Ramaswamy et al. |
| 6,591,302 | B2 | 7/2003 | Boucher et al. ............. 709/230 |
| 6,594,268 | B1 | 7/2003 | Aukia et al. |
| 6,625,671 | B1 | 9/2003 | Collette et al. |
| 6,658,480 | B2 | 12/2003 | Boucher et al. ............. 709/239 |
| 6,681,244 | B1 | 1/2004 | Cross et al. |
| 6,687,758 | B2 | 2/2004 | Craft et al. ............. 709/250 |
| 6,697,868 | B2 | 2/2004 | Craft et al. ............. 709/230 |

(Continued)

OTHER PUBLICATIONS

Clark et al., "*An Analysis of TCP Processing Overhead*," IEEE Communications Magazine, Jun. 1989, pp. 23-29.

(Continued)

*Primary Examiner*—Hong Cho
(74) *Attorney, Agent, or Firm*—Beyer Law Group LLP

(57) ABSTRACT

The present invention is in the field of virtualization of Network Interface Cards and Controllers (NIC) that connect to for example a host computer that can have multiple functions and OS's (referred to as guest functions and guest-OS's) running on it simultaneously and, in particular, relates to the virtualization of the operation of a single NIC such that it can be used simultaneously by multiple guests in such a manner that memory references due to the network traffic originating from and destined to a particular guest is kept separate from other network traffic, and that allows the Media Access Controller (MAC) within the NIC to operate such that it only accepts network packets that are destined to one of the guest-functions or guest-OS's, and the MAC is not required to operate in promiscuous mode where it accept all incoming packets in order to implement the virtualization features.

16 Claims, 5 Drawing Sheets

U.S. PATENT DOCUMENTS

| | | | |
|---|---|---|---|
| 6,708,223 B1 | 3/2004 | Wang et al. | |
| 6,708,232 B2 | 3/2004 | Obara | |
| 6,717,946 B1 | 4/2004 | Hariguchi et al. | |
| 6,751,665 B2 | 6/2004 | Philbrick et al. | 709/224 |
| 6,757,245 B1 | 6/2004 | Kuusinen et al. | |
| 6,757,746 B2 | 6/2004 | Boucher et al. | 709/250 |
| 6,798,743 B1 | 9/2004 | Ma et al. | |
| 6,807,581 B1 | 10/2004 | Starr et al. | 709/250 |
| 6,813,652 B2 | 11/2004 | Stadler et al. | |
| 6,862,648 B2 | 3/2005 | Yatziv | |
| 6,941,386 B2 | 9/2005 | Craft et al. | 709/250 |
| 7,031,267 B2 | 4/2006 | Krumel | |
| 7,093,099 B2 | 8/2006 | Bodas et al. | |
| 7,114,096 B2 | 9/2006 | Freimuth et al. | |
| 7,133,902 B2 | 11/2006 | Saha et al. | |
| 7,133,914 B1 | 11/2006 | Holbrook | |
| 7,191,318 B2 | 3/2007 | Tripathy et al. | |
| 7,239,642 B1 | 7/2007 | Chinn et al. | |
| 7,254,637 B2 | 8/2007 | Pinkerton et al. | |
| 7,260,631 B1 | 8/2007 | Johnson et al. | |
| 7,284,047 B2 | 10/2007 | Barham et al. | |
| 7,313,623 B2 | 12/2007 | Elzur et al. | |
| 7,376,147 B2 | 5/2008 | Seto et al. | |
| 7,408,906 B2 | 8/2008 | Griswold et al. | |
| 2001/0010046 A1 | 7/2001 | Muyres et al. | |
| 2001/0021949 A1 | 9/2001 | Blightman et al. | 709/219 |
| 2001/0036196 A1 | 11/2001 | Blightman et al. | 370/465 |
| 2001/0037406 A1 | 11/2001 | Philbrick et al. | 709/250 |
| 2002/0039366 A1* | 4/2002 | Sano | 370/390 |
| 2002/0087732 A1 | 7/2002 | Boucher et al. | 709/250 |
| 2002/0091844 A1 | 7/2002 | Craft et al. | 709/230 |
| 2002/0095519 A1 | 7/2002 | Philbrick et al. | 709/250 |
| 2002/0156927 A1 | 10/2002 | Boucher et al. | 709/250 |
| 2002/0161919 A1 | 10/2002 | Boucher et al. | 709/238 |
| 2003/0018516 A1 | 1/2003 | Ayala et al. | |
| 2003/0035436 A1 | 2/2003 | Denecheau et al. | |
| 2003/0140124 A1 | 7/2003 | Burns | 709/220 |
| 2003/0200284 A1 | 10/2003 | Philbrick et al. | 709/219 |
| 2004/0003094 A1* | 1/2004 | See | 709/227 |
| 2004/0003126 A1 | 1/2004 | Boucher et al. | 709/250 |
| 2004/0030745 A1 | 2/2004 | Boucher et al. | 709/203 |
| 2004/0054813 A1 | 3/2004 | Boucher et al. | 709/250 |
| 2004/0062245 A1 | 4/2004 | Sharp et al. | 370/392 |
| 2004/0062246 A1 | 4/2004 | Boucher et al. | 370/392 |
| 2004/0064578 A1 | 4/2004 | Boucher et al. | 709/236 |
| 2004/0064589 A1 | 4/2004 | Boucher et al. | 709/250 |
| 2004/0064590 A1 | 4/2004 | Starr et al. | 709/250 |
| 2004/0073703 A1 | 4/2004 | Boucher et al. | 709/245 |
| 2004/0078480 A1 | 4/2004 | Boucher et al. | 709/237 |
| 2004/0088262 A1 | 5/2004 | Boucher et al. | 705/65 |
| 2004/0100952 A1 | 5/2004 | Boucher et al. | 370/389 |
| 2004/0111535 A1 | 6/2004 | Boucher et al. | 709/250 |
| 2004/0117509 A1 | 6/2004 | Craft et al. | 709/250 |
| 2004/0158640 A1 | 8/2004 | Philbrick et al. | 709/230 |
| 2004/0165592 A1 | 8/2004 | Chen et al. | |
| 2004/1058793 | 8/2004 | Blightman et al. | 714/758 |
| 2004/0190533 A1 | 9/2004 | Modi et al. | |
| 2004/0199808 A1 | 10/2004 | Freimuth et al. | |
| 2004/0213235 A1* | 10/2004 | Marshall et al. | 370/392 |
| 2004/0240435 A1 | 12/2004 | Craft et al. | 709/250 |
| 2005/0071490 A1 | 3/2005 | Craft et al. | 709/230 |
| 2005/0120037 A1 | 6/2005 | Maruyama et al. | |
| 2005/0122986 A1 | 6/2005 | Starr et al. | 370/412 |
| 2005/0135378 A1* | 6/2005 | Rabie et al. | 370/395.21 |
| 2005/0135412 A1 | 6/2005 | Fan | |
| 2005/0147126 A1 | 7/2005 | Qiu et al. | |
| 2005/0190787 A1 | 9/2005 | Kuik et al. | |
| 2005/0216597 A1 | 9/2005 | Shah et al. | |
| 2005/0259678 A1 | 11/2005 | Gaur | |
| 2005/0289246 A1* | 12/2005 | Easton et al. | 710/1 |
| 2006/0039413 A1 | 2/2006 | Nakajima et al. | |
| 2006/0080733 A1 | 4/2006 | Khosmood et al. | |
| 2006/0133267 A1* | 6/2006 | Alex et al. | 370/229 |
| 2006/0206300 A1* | 9/2006 | Garg et al. | 703/27 |
| 2006/0209693 A1* | 9/2006 | Davari et al. | 370/232 |
| 2006/0221946 A1 | 10/2006 | Shalev et al. | |
| 2006/0281451 A1* | 12/2006 | Zur | 455/422.1 |
| 2007/0064737 A1 | 3/2007 | Williams | |
| 2007/0110436 A1 | 5/2007 | Bennett | |
| 2008/0002731 A1 | 1/2008 | Tripathy et al. | |
| 2008/0232386 A1 | 9/2008 | Gorti et al. | |

OTHER PUBLICATIONS

Woodside et al., "*The Protocol Bypass Concept for High Speed OSI Data Transfer,*" Research Paper. Available at:http://citeseer.ist.psu.edu/cache/papers/cs/26104/http:zSzzSzwww.sce.carleton.cazSzftpzSzpubzSzcmwzSzbpjan90.pdf/woodside90protocol.pdf.

Rütsche et al., "*TCP/IP on the Parallel Protocol Engine,*" High Performace Networking, (IV, C-14), Elsevier Science Publishers, B.V. North Holland 1993.

Thia et al., "High-Speed OSI Protocol Bypass Algorithm with Window Flow Control," IFIP WG6.4 Third International Workshop on Protocols for High-Speed Networks, Stockholm, Sweden, May 13-15, 1992, pp. 53-68.

Thia et al., "*A Reduced Operation Protocol Engine (ROPE) for a Multiple-Layer Bypass Architecture,*" Protocols for High-Speed Networks IV, 4th IFIP International Workshop, Aug. 10-12, 1994, Vancouver, B.C., Canada, pp. 224-239.

Rütsche et al., "*Architectures of Multimedia Communication Subsystems,*" IFIP Transactions; vol. C-23 archive, Proceedings of the IFIP TC6 International Conference on Information Networks and Data Communication table of contents, pp. 217-230, Year of Publication: 1994.

Dalton et al., "*Afterburner: Architectural Support for High-Performance Protocols,*" http://www.hpl.hp.com/techreports/93/HPL-93-46.pdf, Jul. 1993, 18 Pages.

TRM Technologies, Inc., "*L4/L7 Switching,*" Downloaded from http://www.trm.ca/pages/t-tech7.html on Feb. 16, 2006, 3 Pages.

Madsen et al., "*Wireless Data Communication,*" Fall 2003 Presentation, Wireless Networks Division (WING), Allborg University.

Yocum et al., "*Anypoint: Extensible Transport Switching on the Edge,*" Proceedings of the 4th USENIX Symposium on Internet Technologies and Systems, Mar. 26-28, 2003, Seattle, WA, USA.

International Search Report in PCT/US02/12679, dated Jul. 23, 2002.

Office Action in U.S. Appl. No. 10/474,500, mailed Oct. 4, 2007.
Office Action in U.S. Appl. No. 11/137,146, mailed Mar. 5, 2008.
Office Action in U.S. Appl. No. 11/137,140, mailed Feb. 5, 2008.
Office Action in U.S. Appl. No. 11/250,894, mailed Jun. 26, 2008.
Notice of Allowance in U.S. Appl. No. 10/474,500, mailed Jul. 1, 2008.
Allowed Claims from U.S. Appl. No. 10/474,500.
Office Action in U.S. Appl. No. 11/217,661, mailed Sep. 18, 2008.
Office Action in U.S. Appl. No. 11/313,003, mailed Aug. 22, 2008.
Office Action in U.S. Appl. No. 11/137,146, mailed Nov. 3, 2008.
Office Action in U.S. Appl. No. 11/356,850 mailed Dec. 3, 2008.
U.S. Appl. No. 60/690,465, filed Jun. 14, 2005.
U.S. Appl. No. 60/718,418, filed Sep. 19, 2005.
Office Action in U.S. Appl. No. 11/282,933 mailed Feb. 20, 2009.
Office Action in U.S. Appl. No. 11/250,894 mailed Jan. 26, 2009.
Office Action in U.S. Appl. No. 11/137,140 mailed Apr. 1, 2009.
Office Action in U.S. Appl. No. 11/747,790 mailed May 12, 2009.

* cited by examiner

VIRTUALIZING THE OPERATION OF INTELLIGENT NETWORK INTERFACE CIRCUITRY

CROSS REFERENCE TO RELATED APPLICATIONS

The subject application is related to U.S. patent application Ser. No. 11/313,003, filed Dec. 19, 2005 and entitled "A Method for Traffic Scheduling in Intelligent Network Interface Circuitry", which is related to U.S. patent application Ser. No. 11/282,933, filed Nov. 18, 2005 and entitled "A Method for UDP Transmit Protocol Offload Processing with Traffic Management", which is related to U.S. patent application Ser. No. 11/217,661, filed Aug. 31, 2005 and entitled "Protocol Offload Transmit Traffic Management", all of which are incorporated herein by reference for all purposes.

TECHNICAL FIELD

The present invention is in the field of virtualizing intelligent network interface circuitry (NIC) connectable to a host computer executing multiple functions or multiple Operating System (OS) instances simultaneously and, in particular, relates to the virtualization of the operation of single NIC as viewed by the multiple functions or multiple OS instances.

BACKGROUND

In some sense, network interface circuitry to interface a host computer, executing multiple OS's, to a network is known but somewhat limited. For example, for ingress communication (network to host), a Media Access Controller (MAC) within the NIC can be set to accept all layer-2 network packets that arrive at the NIC from the network (promiscuous mode operation) and a network protocol stack within a virtual operating system (VOS), such as provided by Vmware or Xen, on a host computer can then de-multiplex the layer-2 network packets arriving at the host to separate network processing stacks within multiple guest operating systems (guest-OS's) executing on top of the VOS. In other words, the VOS protocol stack forwards unicast packets destined for one or more guest-OS's, and also multicast and broadcast packets, but drops unicast packets that are not destined for any of the guest-OS's. For egress communication, the guest-OS's accomplish sending packets by copying from memory associated with a particular guest-OS to memory associated with the VOS generally, and the VOS then operates to send the packets.

With the recent advances in networking speed, it has become possible to foresee a "unified wire" approach to connectivity. From a network connectivity perspective, it is typical to have in one computer system different NICs for different applications. For example, it is usual to need an Ethernet NIC for general network and Internet connectivity, a Fibre Channel NIC for storage connectivity and a specialized high speed interconnect NIC for high performance computing connectivity. In particular, the Ethernet technology has recently reached speeds high enough to enable the support of these different applications simultaneously over one "multi-function" NIC. The benefits of unifying the "wire" are numerous, including but not limited to the single NIC and single network cost savings as well as the simplified management. However, in-order to preserve the useful characteristics and match the performance of specialized storage and high performance computing networks, it is desirable to enhance the capabilities of the unified wire, for example, to support the storage protocols iSCSI and the Network File System (NFS), and Remote Direct Memory Access (RDMA). In addition, it is needed to provide control on the resource usage of each application type within the unified wire.

For both the egress and ingress direction, the NIC can optionally offload the processing of some network protocols. For example, the protocol offload processing may be according to a Transmission Control Protocol (TCP), whereas communication across the network (layer-2) may be via high-speed Ethernet, such as 10 Gbps Ethernet.

SUMMARY

The present invention is in the field of virtualization of network interface circuitry (e.g., as embodied within network interface cards and/or network interface controllers) configurable to connect a network and a host computer having multiple functions or OS's (referred to as guest-functions or guest-OS's) executing simultaneously. In particular, in one aspect, the present invention relates to the virtualization of the operation of the NIC, such that the NIC can be used simultaneously by multiple such guests in such a manner that memory references due to the network traffic originating from and destined to a particular guest are segregated from other network traffic. In one aspect, the Media Access Controller (MAC) within the NIC operates such that the MAC only accepts layer-2 network packets with payload destined to one of the different guests, and the MAC is not required to operate in promiscuous mode, accepting all incoming packets in order to be able to implement the virtualization features. In another aspect, the NIC is equipped with traffic management which provides control on the resources used by each guest.

DETAILED DESCRIPTION

We now discuss a shortcoming with the approach described in the Background for handling layer-2 network traffic destined for multiple guest-functions or multiple instances of guest-OS's operating on a host computer executing on top of a virtualization layer (also called virtual operating system (VOS) when multiple instances of guest-OS's are present). The "guest function" corresponds to a particular protocol stack instance. This can for example refer to the TCP/IP networking stack, and the SCSI storage stack used or usable from within the same instance of a guest-OS. In this case the TCP/IP networking stack would represent one "guest function" and the SCSI storage stack another "guest function". This is just one example of the usage of multiple "guest functions" within a particular instance of a "guest OS." In a case where there is only one protocol stack used or usable from within an instance of a guest-OS, then the instance of the guest-OS is considered to have a single guest-function associated with it, which is the instance of the guest-OS itself. In addition, it should be noted that some or all of the instances of guest-OS's may be separate instances of the same OS, such as, for example, Windows or Linux.

In particular, the approach described in the Background places a computational load on the virtualization layer or VOS to demultiplex the network traffic, and this load can be quite substantial for high-speed network interfaces. Another shortcoming is the overhead associated with copying data from memory associated with the virtualization layer or VOS to memory associated with the destination guest-functions or instances of guest-OS's in all cases for ingress packets, and copying data from memory associated with a particular origin guest-OS instance to memory associated with the VOS in the egress direction.

It is thus desirable to reduce the computational load and overhead on the virtualization layer or VOS associated with processing ingress packets destined to multiple guest functions or instances of guest OS's. It is also desirable to protect against each guest-function or guest-OS instance corrupting data structures for packet ingress associated with the other guest-functions or guest-OS's. Conventionally, data structures for direct memory access (DMA) such as command queues, free-list pages, and completion queues are shared for network traffic destined to the multiple guest-functions and instances of guest-OS's, and memory corruption by one guest-OS instance thus necessarily affects the other guest-functions and instances of guest-OS's. In the remainder of this discussion, we will consider the example where multiple instances of OS's are running atop a VOS. A similar discussion applies to the case where multiple functions are supported atop a virtualization layer or a combination of multiple functions and multiple instances of OS's are in use.

Figure 1:
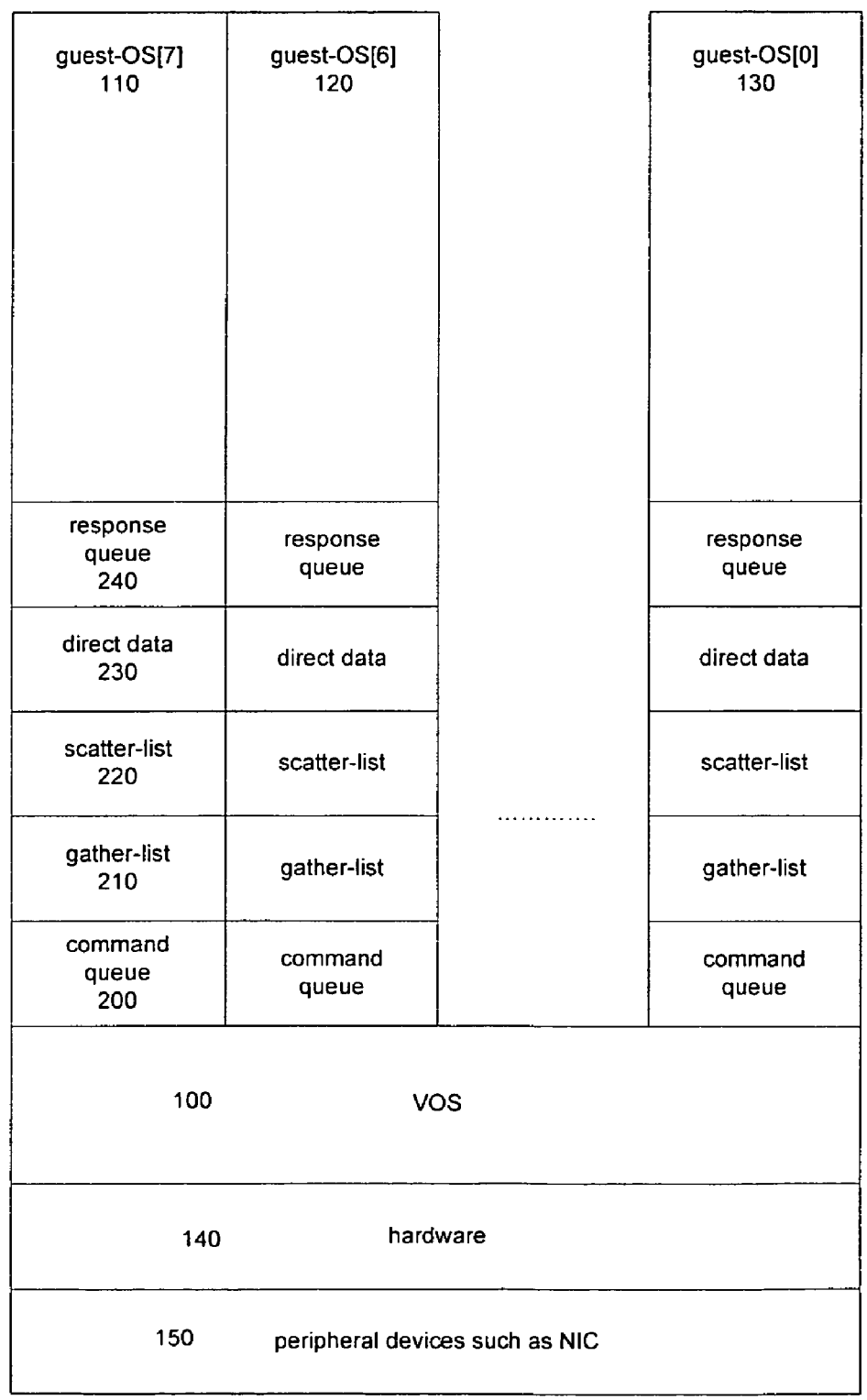
FIG. 1 illustrates an architecture of a system in which network interface circuitry interfaces a host computer to a network, and in which a virtualization layer or virtual operating system (VOS) is executing on the host computer and multiple guest functions or operation systems (guest-OS) that are executing on the host computer on top of the virtualization layer or VOS.

Specifically, referring now to FIG. 1, it is desirable to be able to virtualize the network interface circuitry that provides an interface between a network 102 and a host computer 105, where the host computer 105 has a single virtual operating system (VOS) 100 with multiple guest operating systems (instances of guest-OS's 110, 120, 130) executing on top of the VOS 100. The VOS 100 may be, for example, a virtual operating system such as provided by Xen or Vmware. In particular, each guest-OS instances interacts with the single NIC 150 as if the single NIC 150 were a private NIC, not shared with the other instances of guest OS's. In FIG. 1, three instances of guest OS's are shown as an example, but a VOS can in principle have any number of instances of guest-OS's executing on top of it.

In accordance with one aspect described here, the promiscuous mode of the MAC (described in the Background) is not used. In accordance with another aspect, memory references resulting from network traffic originating from, and destined to, each guest-OS instance is segregated from memory references resulting from network traffic from/to the other instances of guest OS's. Having the NIC not be in promiscuous mode has an advantage of decreasing the ingress packet traffic (between the NIC and the host) and thereby minimizing or eliminating the overhead of the host processing packets not destined for any of the instances of guest-OS's. Memory reference safety may be accomplished, for example, by segregating the DMA command queues, gather-lists, free-lists, and completion queues used by each guest-OS instance.

Copying and delivery of multicast and broadcast network traffic to the instances of guest OS's can optionally be handled or assisted by the NIC, so that all the processing of network traffic is offloaded to the NIC. In addition, direct data placement (DDP) can be accomplished safely by having the VOS validate the creation of the DDP regions by the instances of guest-OS's. As mentioned above, each of the instances of guest-OS's uses a separate data structure for DMA transfers (e.g., referred to here as command queue 200, gather-list 210, free list 220, direct-data region 230, and response queue 240). FIG. 1 illustrates an example in which the data structures used for such DMA reside within different non-overlapping memory regions, but this is not necessarily required.

We first discuss the egress (host to network) data path. Referring specifically to FIG. 1, for egress data, commands are placed in the command queue 200 for a particular guest-OS instance, indicating that payload data is to be DMA read from the corresponding DMA gather-list 210. The command queue 200 itself is DMA read by the NIC 150. The NIC 150 writes to the particular response queue 240 for the guest-OS instance when a command has been completed, thus providing the host an update on the progress of the execution of the DMA commands.

For the ingress (network to host) data path, the NIC 150 either directly writes payload data into the direct data 230 region for the destination guest-OS instance, or writes payload data to the scatter-list 220 for the guest-OS instance indicated in one or more entries of the scatter-list 220 for the guest-OS instance. In the direct data 230 case, placement information (i.e., mapping) for the guest-OS is previously communicated to the NIC 150, for example as part of setting up a remote DMA transfer or to enable direct data placement of socket API read( ) response data. In the free list case, the location of the scatter-list pages for the guest-OS instance has been previously communicated to the NIC 150, e.g., via DMA reads. Finally, the response queue 240 for the guest-OS instance is typically also written for ingress transfers for the guest-OS instance to indicate that a particular entry has been placed in either a free-list 220 entry or entries, or that payload data has been directly placed in the direct data 230 region for the guest-OS instance.

In some examples, the NIC 150 is configured to offload protocol processing for some protocols. For example, the NIC 150 may have capability to offload processing for the TCP protocol. In another example, as previously noted, the NIC 150 may have capability to offload protocols at layers above TCP, such as iSCSI and NFS.

As a result of the virtualization capabilities of the NIC 150, the memory references due to egress network traffic originating from a particular guest-OS instance are segregated in one or more command queues 200, and one or more gather-list 210 data structures on the host computer may also be segregated within the NIC. In addition, segregated response queues 240 may be used. In some examples, the egress traffic is segregated within the NIC by mapping packets from a particular guest-OS instance to particular queues within an egress packet scheduler within the NIC. However, in some examples, the egress packet traffic corresponding to different instances of guest-OS's is interleaved through the NIC.

Furthermore, the virtualization configuration of the NIC 150 is such that memory references due to ingress network traffic arriving at the NIC from the network are segregated within the NIC 150, and are steered to separate segregated scatter-lists 220, direct data region 230, and response queue 240, corresponding to a particular guest-OS instance 110 120 130.

In sum, the just-described mode of mode of operation is referred to by us as multiple guest-functions or instances of guest-OS's running securely on top of a virtualized NIC. For example, multiple instances of Windows or Linux may be running on top of a VOS such as provided by VMware or Xen. In another example, iSCSI, RDMA and TCP/IP sockets may be running on top of a virtualization layer. Each instance of the guest-function and guest-OS broadly sees itself running on its own (virtual) NIC, while in effect it is running along with other functions and instances of guest OS's on top of a single virtualized NIC. The operation is referred to as "secure" because each guest-function and guest-OS instance has its own data structures in the host memory and one guest-function or guest-OS instance therefore will not corrupt the memory associated with the operation of the other guest-function and guest-OS instances. Because the different guest-functions and instances of guest-OS's use different data structures, a particular guest function or guest-OS instance does not have access permission to the physical memory in use by the other guest functions and instances of guest-OS's.

Having generally described virtualization of a NIC, we now describe three specific approaches to achieving virtualization of a NIC.

In accordance with the first approach, the virtual NIC's are operated in what is referred to as "promiscuous mode," such that all ingress Ethernet packets are forwarded to the virtualization layer or VOS. For example, an incoming packet with a destination MAC Address that does not match any of the local MAC addresses will not be dropped. Instead, the incoming packet will reach the virtualization layer or VOS. The virtualization layer or VOS may then make a decision to drop packets that have destination MAC addresses not corresponding to any of the guest-functions and instances of guest-OS's and also drop packets with a matching destination MAC address but a non-matching destination IP address. The virtualization layer or VOS also processes broadcast and multicast packets. Note that the guest functions and instances of guest-OS's may or may not utilize the same local MAC address.

In contrast to the first approach, the second approach employs destination address filtering in the NIC, such that only those packets having an address corresponding to one of the guest-OS's are accepted by the NIC and forwarded to the VOS. The multicast packets are typically also filtered, and a packet that is not destined for any of the instances of guest-OS's is dropped. The broadcast packets are typically delivered to all guest functions and instances of guest-OS's. Note that the destination address used in this method may be the MAC address or the IP address. Therefore, the virtualization layer or VOS matches the local MAC or Internet Protocol address (LIP) for the guest functions or instances of guest-OS's in this approach and processes broadcast and multicast packets.

The third approach also employs destination address filters, but uses an indirection-map to map the matching packets to a guest-function or guest-OS instance via an index (sometimes referred to in this description as the "guest_idx" and/or "steering index"). For example, the MAC address of an ingress Ethernet packet is matched to a guest_idx using a lookup table. If the packet encapsulates an IP packet, the destination IP address in the IP packet is then compared to the IP address (one or more) associated with the particular guest-OS instance having the particular MAC address index (guest_idx steering index). Packets that do not have a valid (guest_idx, LIP) tuple are dropped in the NIC.

In this third approach, filtering is achieved by parsing the Ethernet packets and applying a filtering rule associated with the guest_idx (that is part of the tuple that indicates if the packet should be accepted or dropped). In a NIC that implements protocol offload, this approach accommodates offloaded protocols by adding the guest_idx to the tuple that typically includes the 4-tuple (LIP, LP, FIP, FP) for either the TCP or UDP protocols. As an example, the resulting 5-tuple would be used as an identifier of a particular TCP connection or UDP stream.

A step in the virtualization with this third approach employs the guest_idx steering index to steer the incoming packet directly, without the intervention of the virtualization layer or VOS, to the appropriate destination guest-function or guest-OS instance. For this purpose, the NIC uses the guest_idx steering index, optionally along with other fields of the packet or other pertinent information or criteria, to select a queue triplet (e.g., send-queue/response-queue/completion-queues for RDMA/iWARP traffic, or command-queue/free-list-queue/response-queue for other traffic) corresponding to the appropriate guest-function or guest-OS instance. The selection step may further involve the determination of a particular CPU number on which the received packet is to be processed. Using a target CPU number, the packet processing load may be distributed among potentially multiple CPUs on the system.

Two options with this third approach are now described to process multicast and broadcast packets. The distribution of these packets can either be performed by the NIC that receives the multicast and broadcast traffic or, alternately, these packets can be sent to the virtualization layer or VOS for processing. With the latter alternative, the packets may be mapped to one or more specific command-queue/free-list-queue/response-queue triplets, which facilitates processing of the packets by the virtualization layer or VOS. A benefit of the first option is that broadcast and multicast packets may be processed without involvement of the virtualization layer or VOS, but this is at the cost of multiple copies of the packet being provided over the host (e.g., PCI) bus. A decision as to which option to utilize may be based, for example, on a particular context and usage scenario.

In one example for processing multicast Ethernet packets, the Ethernet destination address is provided as input to a hashing function, the result of which is used to determine if the packet is to be accepted or dropped by the NIC. The result of the multicast address hash is compared to the allowed hash values, which are provided to the NIC by the virtualization layer or VOS on behalf of the guest functions or instances of guest-OS's. This results in a partial (imperfect) filtering of undesired multicast traffic, since the filtering criterion is not exact. In other words, the exact MAC address matching criteria is replaced by a hash of the multicast, and if a match to a hash table is produced within the Ethernet media access control block of the NIC, the packet is accepted. The packet may then be multicast/broadcast to the different guest-functions and guest-OS's by an on-chip module that has stored a table with information about which guest-function or guest-OS subscribes to which multicast. The NIC can, based on this determination, either multicast the packet to the appropriate guest functions or instances of guest-OS's, or deliver the packet to the virtualization layer or VOS that performs the multicast/broadcast, possibly based on an indication of this determination provided by the NIC along with the packet.

A guest function or OS may be configured to operate its virtual NIC(s) in promiscuous mode, while other virtual NIC's are independently configurable. Promiscuous mode operation may be useful in certain circumstances, such as for troubleshooting network problems. It is therefore useful for the NIC to support the promiscuous mode operation on a per-virtual NIC basis. In this case, the NIC can relax the filtering rule used for the particular guest-OS instance that is configured to operate the virtual NIC in this mode. As a result, the particular guest-function or guest-OS instance is provided with copies of all the packets received, even those that are determined to be destined to other guest-functions and instances of guest-OS's, regardless of the destination MAC address.

Figure 2:
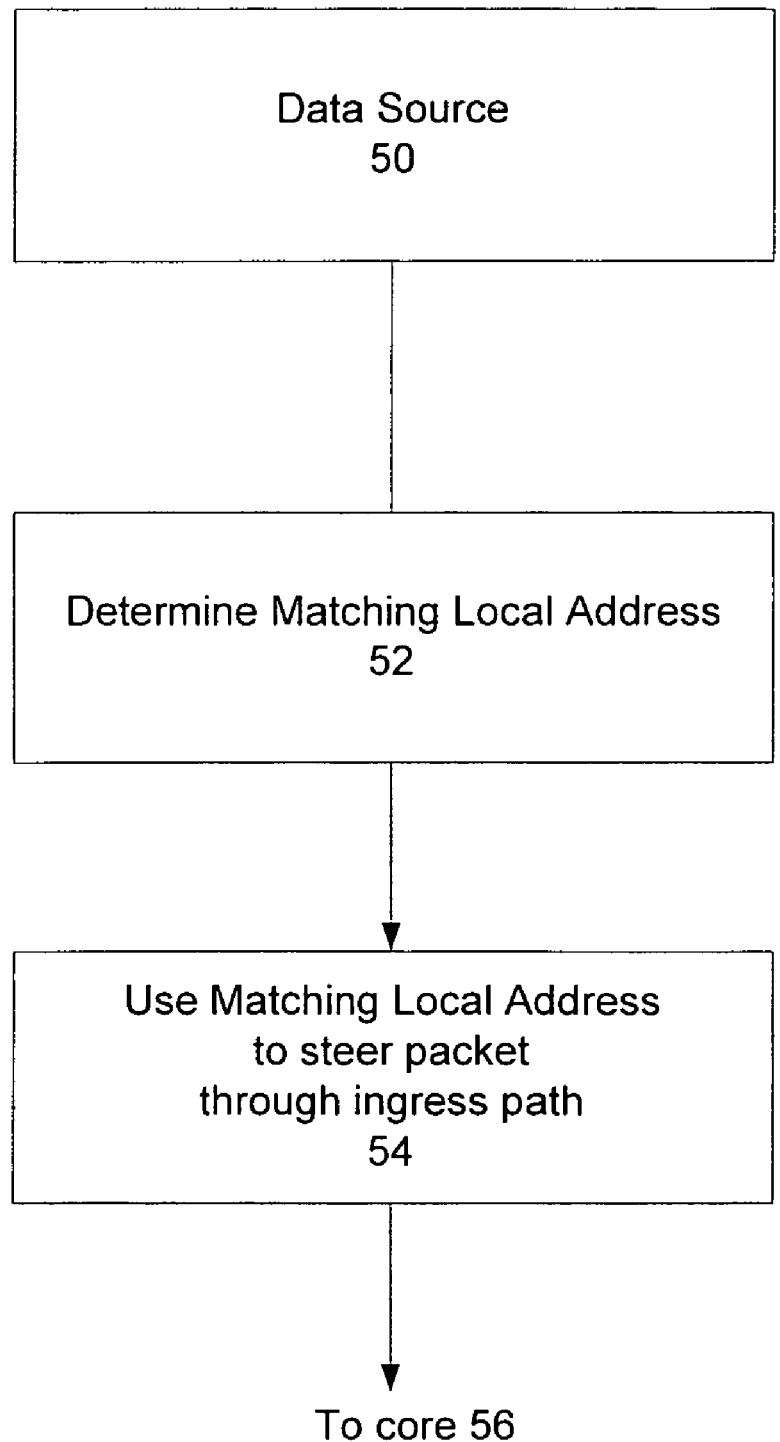
FIG. 2 is a block diagram broadly illustrating a virtualization operation in the ingress path of the network interface circuitry.

FIG. 2 broadly illustrates an implementation of the virtualization capability for the ingress path within the processing pipeline of a NIC. A data source 50 is a source of packets received from the network. For example, the data source 50 may be a peer on a 10 Gbps Ethernet network. An Ethernet destination address filtering lookup device 52 looks up in a filtering rule database the steering index (guest_idx) corresponding to the matching 48-bit Ethernet local address. When there is no matching entry, the packet is dropped unless the device is operating in promiscuous mode, for example on behalf of one of the instances of guest OS's.

The MAC address is 48-bits wide for Ethernet, and the size of the index is at least the logarithm of the maximum number of supported addresses in the filtering database. For example if 65536, 1024, 256, or 8 addresses are the maximum number of supported addresses in the database, the size of the index is at least 16 bits wide, 10 bits, 8 bits, and 3 bits wide, respectively. In some examples, for efficiency reasons, the steering index is used within the processing path rather than the MAC address itself. The steering index, described below, is used within the processing path to steer a packet 54 to the correct DMA scatter-list, and response queue. If the packet is indicated as being multicast, then it may be handled as discussed above (according to a hash table).

Figure 3:
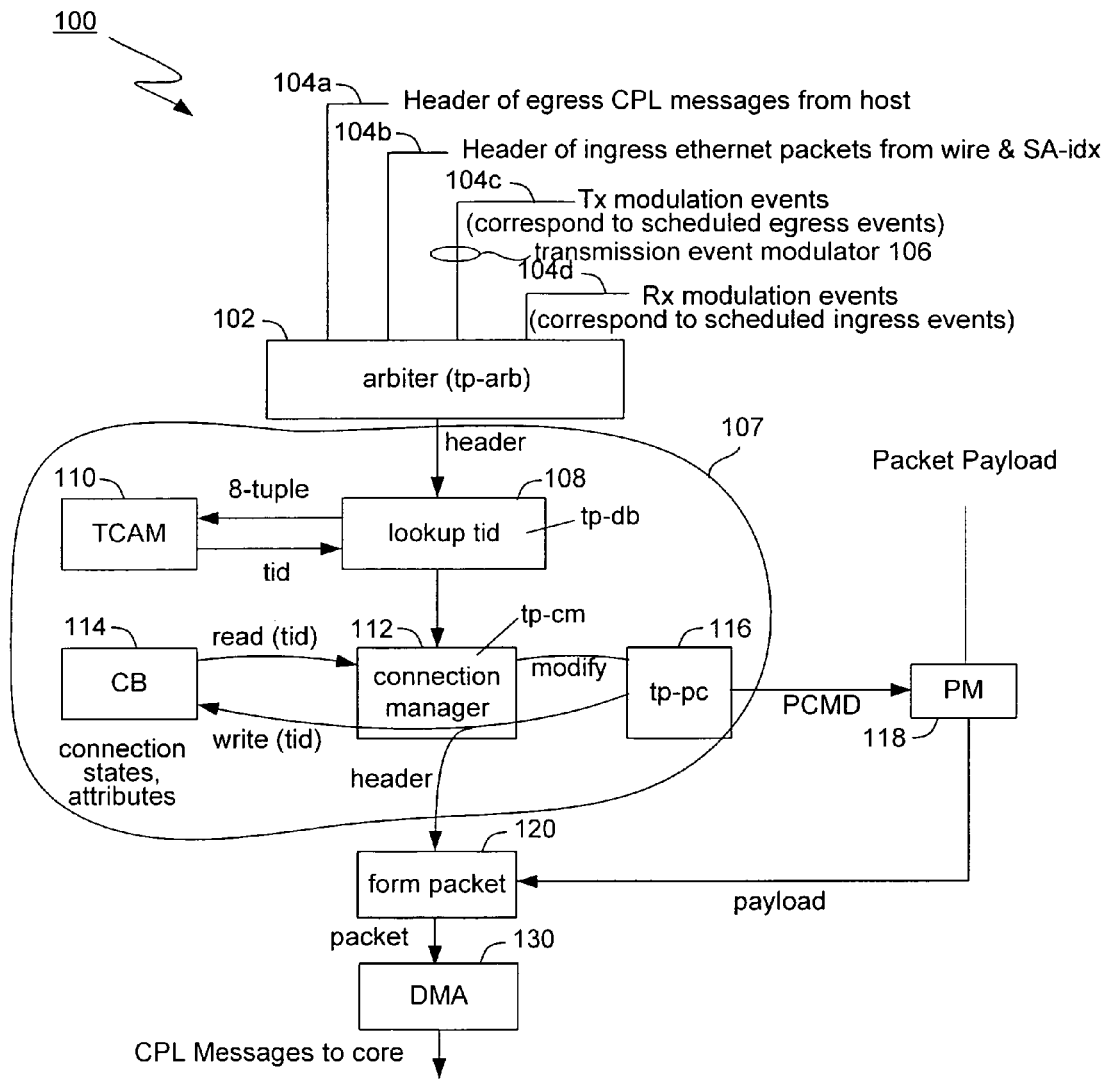
FIG. 3 illustrates architecture of a flow processor to handle protocol offload processing and including virtualization support.

Turning now to FIG. 3, a flow processor architecture of the interface device 100, having an ingress virtualization capability, is described. An arbiter 102 arbitrates among various signals such as headers of control messages from a host (104a), data packets from the physical wire of the network (104b), transmission modulation event tokens (104c), and receive modulation event tokens (104d). The transmission modulation event tokens are associated with the transmission scheduler, and the receive modulation event tokens with the receive scheduler, respectively.

It is noted that the arbiter 102 is a feature of the particular flow processor architecture of the FIG. 1 device and has only an indirect effect on the virtualization capability. When the arbiter 102 operates to allow an ingress Ethernet packet through, the protocol header, the guest_idx steering index and an indication of whether the MAC address is unicast, multicast or broadcast attached to the header by the MAC device, are provided to the protocol processing block 107.

The protocol processing block 107 includes a lookup block 108 that locates the state for an offloaded protocol such as TCP and that is additionally used to filter packets (e.g., obtain filtering rules) that, for example, do not have a destination IP address that is consistent with the guest_idx steering index. A packet is identified by the header or headers that the packet contains. As an example, the headers for Ethernet packets contain at least a protocol stack layer-2 Ethernet packet, and when the Ethernet packet encapsulates an IP packet, a packet will also contain a layer-3 IP header, and when the IP header encapsulates a layer-4 TCP (or UDP) protocol, it will also contain a TCP (UDP) header. For a TCP packet, a 4-tuple including a source and destination IP address and a source and destination port numbers is said to uniquely identify a point-to-point connection that uses the protocol.

For offloaded connections, the lookup minimally considers the 4-tuple information and the Ethernet address lookup index guest_idx steering index corresponding to the destination Ethernet MAC address. In addition, the lookup may consider information about the Virtual Local Area Network (VLAN) to which the packet belongs, when VLAN's are being used, and perhaps the NIC port on which the packet arrived. In some examples, the lookup block 108 operates to match the protocol header to an internal identification ("tid," used by the interface device and the host) corresponding to a particular protocol or filtering rule Control Block (CB). In the FIG. 3 example the lookup database is implemented with a TCAM memory, which allows looking up the location of a CB in pipelined fashion, with one tid result being returned from the TCAM every clock cycle after a pipeline startup delay. In place of the TCAM, other structures (such as hashing or a search tree) may be employed for lookup.

The lookup block 108 then provides the tid, received from the TCAM 110, to connection manager circuitry 112 that manages the CB connection state and attributes. In the FIG. 3 example, the connection state and attributes are in a Control Block (CB) 114. The connection manager 112 operates in concert with the payload command manager 116 to generate and provide payload commands to a payload manager block 118.

In particular, for offloaded connections, the connection manager 112 provides the tid to the CB 114, and the CB 114 provides the current connection state and attributes for the connection (i.e., the connection to which the tid corresponds) to the connection manager 112. Based on the current connection state and attributes provided from the CB 114, the connection manager 112 determines that the connection state corresponds to an offloaded connection, how to appropriately modify the connection state and provides, to the payload command manager 116, an indication of the modification to the connection state. Based on the indication of the modification, the payload command manager 116 issues one or more appropriate payload commands to the payload manager block 118 to cause payload data to be forwarded to the host (via the form packet block 120) or to create Rx modulation events to schedule delivery of data to the host. The packet formed by the form packet block 120 contains the guest_idx steering index. The CB also contains the guest_idx value to use when sending packets to the host.

For filtering rules, the CB includes an indication of whether a packet is to be forwarded to the host or is to be dropped. In the context of the virtualization functionality discussed above, a dropped packet might, for example, correspond to a packet with a matching MAC address but with an IP address that is not consistent with the particular MAC address.

For offloaded connections, the connection manager 112 writes the modified connection state and attributes back into the CB 114. The read, modify and write of the connection state and attributes is done in an atomic operation. Here, "atomic" refers to the property that a read of the CB always returns the most recent state of the particular CB, even though the pipeline might be processing multiple messages simultaneously, that are associated with the same CB. The connection manager 112 provides an appropriate packet header for data transmission to a form packet block 120. Meanwhile, the payload manager block 118 provides the corresponding payload to the form packet block 120 (as discussed above, based on payload commands from the payload command manager 116). The form packet block 120 combines the packet header and corresponding payload into a packet for transmission to the host computer.

In the FIG. 3 example, packet data is transmitted to the host in a Control Protocol Language (CPL) message encapsulated manner so the form packet block 120 issues CPL messages for transmission to the host computer by the DMA (Direct Memory Access) block 130. The CPL message includes an index derived from the guest_idx steering index into a structure that points to the appropriate scatter-list queue and response-queue. For a direct data placement (DDP) message, the destination memory address is found and placed in an appropriate CPL DDP message. The response message uses the response-queue index to place a DDP buffer completion message, if applicable, in the appropriate completion queue. The CPL message arrives at the DMA engine 130 that looks up the free-list to use based on the provided index, and the response queue to use based on the provided index, and DMA writes the CPL message to the selected free-list, or in the DDP case writes the data to that particular physical memory address, and if applicable, writes a buffer completion message to the response queue when the DMA write of the payload is done.

Figure 4:
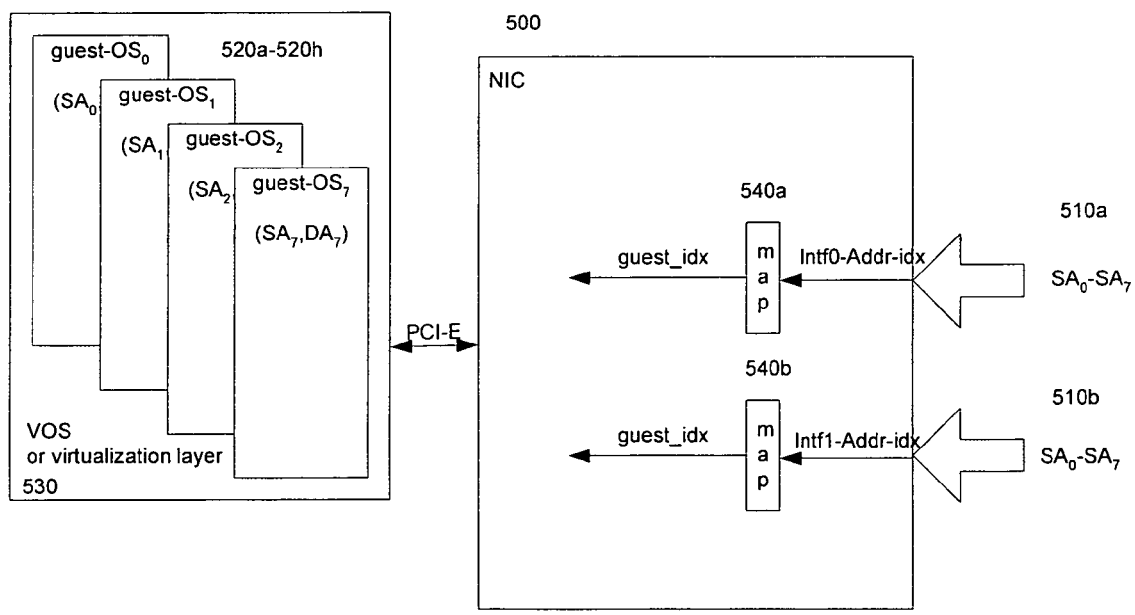
FIG. 4 illustrates a more detailed version of the FIG. 2 block diagram.

Turning now to FIG. 4, an example is shown schematically of a design for an 8-way virtual NIC 500, with two 10 Gbps Ethernet ports 510a and 510b. This example for the sake of illustration is in the context of multiple guest OS's executing on a host system. Eight instances of guest OS's 520a-520h are running in a host computer on top of a VOS 530. The NIC implements "stateful" functionality such as for iSCSI, RDMA, and/or TCP Offload Engine TOE functionality, in additional to the stateless offload functionality such as large send and checksum offload. Each of the eight instances of guest-OS's 520a-520h in the FIG. 4 example has its own MAC address (Ethernet/Layer-2 Address). Further, each of the instances of guest-OS's has one or more of its own Local Internet Protocol addresses (LIP). The different guest-OS's would not, in general, have the same LIP address except for instances of guest-OS's on different VLANs since, otherwise, this would result in error conditions (e.g., would imply responses by two stacks within different instances of guest-OS's to ARP requests, etc.). Each guest OS instance may independently configure the NIC with rules for filtering multicast MAC addresses and multicast IP addresses.

An example of processing steps to utilize the FIG. 4 NIC circuitry 500 is now described with reference to FIG. 5. At step 502, the destination MAC address (DA) of an ingress level 2 Ethernet packet is extracted from the packet. At step 504, the DA is matched with the eight filtering database perfect match local address entries 540a or 540b (FIG. 4) depending on the interface on which the message arrives, and a 3-bit source address index is derived (int0-idx for interface-0, or int1-idx for interface-1) or the packet, if non-matching, is dropped.

At step 506, the local address index is mapped to the guest_idx (steering index), which indicates the guest OS instance to which the DA is mapped. At step 508, the steering index is included as part of the tuple used to look up the tid (as described with reference to FIG. 3).

Figure 5:
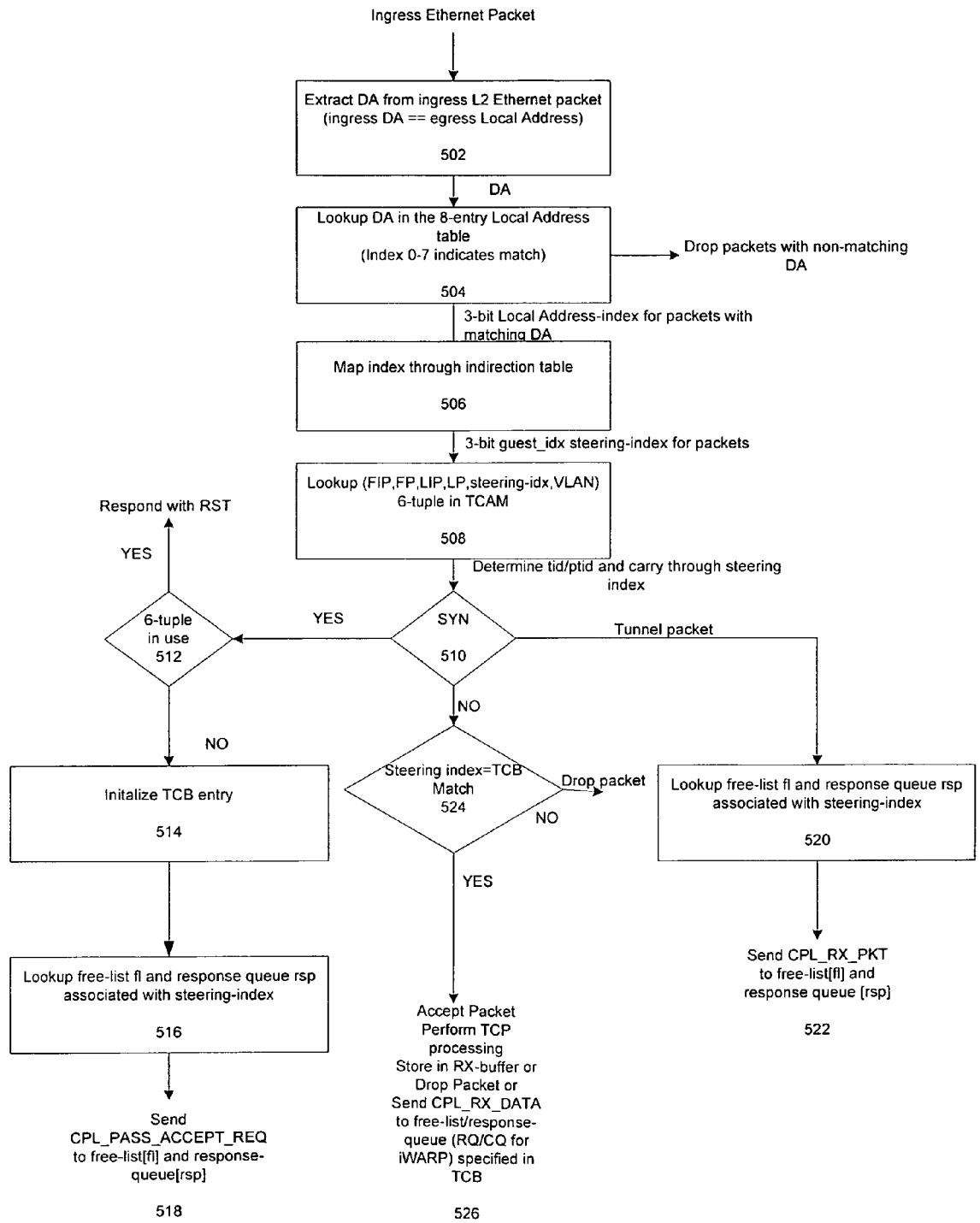
FIG. 5 illustrates a flow diagram illustrating operation of the NIC and emphasizing the virtualization process for ingress network traffic.

Before continuing on with describing FIG. 5, it is noted that, in general, the connection state block for offloaded packets includes information useable to steer, to the correct free-list and response queues, packets belonging to each particular connection. For example, the state block may contain the CPU number on which the corresponding guest OS instance is running, and the CPU number can then be mapped to the queues using a programmable mapping table. In some examples, for non-offloaded packets, the guest_idx is used, along with possibly other fields of the packet, to steer each packet to the correct free-list and response queue. This can be achieved by computing an index into a mapping table, the index based on the guest_idx and a hash of a combination of, for example, the (LIP, FIP, LP, FP) fields when available in the packet. The computed index can then be used to look up an intermediate index, which, in turn can be used to lookup a free-list index and a response-queue index in a programmable mapping table.

A result is that traffic "belonging" to one guest OS instance can be distributed to different CPUs and queues for load balancing. For example, for the eight guest-OS instance example, one entry for each map 540a and 540b could be configured to map to the same 5th tuple value such that each guest-OS instance is allocated one local MAC address in the filtering database on each interface. The 5th-tuple returned for each interface could then map to the same free-list index, and the same response queue index. The ingress messages destined for a particular guest-OS would, in this manner, map to the same free-list and response queue, and the ingress messages destined for different instances of guest-OS's would map to different free-lists and response queues.

Another resulting observation is that different instances of guest-OS's can share the same local source MAC address and the steering of the traffic to the different instances of guest-OS's be based on other information, such as all or part of the 4-tuple.

In summary, 5-tuple virtualization has an advantage of allowing the NIC to be run with MAC address matching that enables Layer-2 demultiplexing, and also enabling the switching of ingress unicast packets on the NIC (other than broadcast and multicast packets, which would typically require additional processing on the NIC or in the host). In addition, the use of VLAN tags (to partition a LAN into many virtual LAN's) is naturally supported by this scheme, by including the VLAN tag as part of a 6-tuple that is used to determine the index.

We now return to FIG. 5. As discussed above with reference to steps 502, 504, 506 and 508 of FIG. 5, initially, ingress Level-2 packets are processed to determine a tid (identifying a state block corresponding to upper layer information encapsulated in the Layer-2 packet) and a steering index. The flow chart in FIG. 5 shows the processing of ingress packets from the time they enter the intelligent network interface circuitry until a CPL message is sent to a particular free-list/response queue (or RQ/CQ for iWARP, a type of DMA interface, i.e., request queue and completion queue).

At step 510, it is determined if the packet is an offloaded connect request packet, such as a TCP SYN packet. If so, then at step 512 it is determined if the 6-tuple (step 508) is already in use. If so, then a RST error message may be sent back to the peer that sent the connection request message. If the 6-tuple is not already in use, then a TCB entry is initialized at step 514. In addition, at step 516, the steering index is used to look up a free-list and response queue for use with the connection. At step 518, a CPL command is provided to the host indicating that the connection was setup and indicating the parameters of the connection.

If, at step 510, it is determined that there was no hit in the TCAM for offload processing (step 508) for the 6-tuple, then the layer-2 packet is a tunnel packet, which is to be provided to the host without substantial protocol processing by the network interface circuitry. In this case, at step 520, the steering index is used to look up a scatter-list and response-queue for the connection, and a control protocol message is sent to the host at step 522 indicating receipt of the "tunnel" (non-offloaded) packet.

If it is determined that there was a hit in the TCAM for offload processing for the 6-tuple, then at step 524 it is confirmed that the steering index is contained in the TCB entry indirectly indicated by the 6-tuple. If the steering index is not contained in the TCB entry, then the packet is dropped. Otherwise, the packet is processed according to the offloaded protocol (TCP, in the illustrated case) and the data is communicated as appropriate to the host computer, according to the principles discussed above.

With regard to egress packets, as discussed above, egress virtualization is achieved by using different command queues and response queues for the different guest-OS's, and gather-lists use physical memory locations that can not be accessed by (that are not mapped for) the other guest-OS's.

Internally to the NIC, traffic belonging to different guest functions or guest OS's may be discriminated and treated differently according to traffic management. Traffic management in both the receive and transmit direct is described in several pending patent applications, each of which is incorporated herein by reference in its entirety: U.S. patent application Ser. No. 11/217,661, filed Aug. 31, 2005 and entitled "Protocol Offload Transmit Traffic Management"; U.S. patent application Ser. No. 11/282,933, filed Nov. 18, 2005 and entitled "A Method for UDP Transmit Protocol Offload Processing with Traffic Management"; and U.S. patent application Ser. No. 11/313,003, filed Dec. 19, 2005 and entitled "A Method for Traffic Scheduling in Intelligent Network Interface Circuitry."

What is claimed is:

1. A method of operating network interface circuitry, wherein the network interface circuitry is configured to couple a host computer to a network to facilitate communication over the network between the host computer and a peer, the method comprising:
by the network interface circuitry,
receiving data from the peer via the network; and
processing the received data, including:
where there is a layer-2 classification rule associated with characteristics of the received data, automatically applying the classification rule to the received data; and
demultiplexing the received layer-2 packets according to destination queues associated with the host computer,
wherein the method further comprises:
applying to the received data a layer-3 classification rule associated with characteristics of the received data, thereby filtering ingress packets that have layer-2 characteristics not consistent with the layer-3 characteristics; and
applying to the received data a VLAN classification rule associated with characteristics of the received data, thereby filtering ingress packets that have layer-2 characteristics and layer-3 characteristics that are not consistent with the VLAN characteristics.

2. A method of operating network interface circuitry, wherein the network interface circuitry is configured to couple a host computer, executing a plurality of guest functions, to a network to facilitate communication over the network between the host computer and a peer, the method comprising:
by the network interface circuitry,
receiving data packets from the peer via the network; and
processing the received data packets, including:
processing a classification rule associated with characteristics of the received data packets and automatically applying the classification rule to the received data packets to determine at least one set of at least one destination queue associated with the host computer; and
demultiplexing the received data packets according to the determined at least one set of at least one destination queue, each separate set of at least one destination queue associated with a separate guest function configured for execution on the host computer, wherein:
the host computer is executing a virtual operating system on top of which a plurality of operating system instances are executing, each operating system instance being an instance of a guest-OS having at least one of the guest-functions associated therewith;
at least one of the set of destination queues is associated with the virtual operating system; and
the classification rules are such that broadcast and/or multicast packets are demultiplexed according to the at least one of the set of destination queues that is associated with the virtual operating system.

3. The method of claim 2, wherein:
the method further comprises performing protocol processing at the higher layer within the network interface circuitry.

4. The method of claim 2, wherein:
demultiplexing the received data packets according to separate destination queues associated with the host computer includes directly placing at least a portion of a received packet into memory associated with the separate guest function with which the separate destination queue is associated.

5. The method of claim 2, wherein:
for at least one of the guest-OS instances, that guest-OS instance is itself a guest-function associated with that guest-OS instance.

6. The method of claim 2, wherein:
the classification rules are further such that the demultiplexing operation includes providing an indication of at least a particular one of the plurality of guest-functions.

7. The method of claim 2, wherein:
the classification rules are such that broadcast and/or multicast packets are demultiplexed according to the sets of destination queues configured to receive the broadcast and/or multicast packets.

8. The method of claim 7, wherein:
the classification rules are such that multicast packets, which cannot be demultiplexed to at least one set of destination queues configured to receive the multicast packets, are filtered.

9. The method of claim 2, further comprising:
for at least one of the destination queues, controlling a rate at which the data is provided from that destination queue to the host.

10. A method of operating network interface circuitry, wherein the network interface circuitry is configured to couple a host computer, executing a plurality of guest functions, to a network to facilitate communication over the network between the host computer and a peer, the method comprising:
by the network interface circuitry,
receiving data packets from the peer via the network; and
processing the received data packets, including:
processing a classification rule associated with characteristics of the received data packets and automatically applying the classification rule to the received data packets to determine at least one set of at least one destination queue associated with the host computer; and
demultiplexing the received data packets according to the determined at least one set of at least one destination queue, each separate set of at least one destination queue associated with a separate guest function configured for execution on the host computer, wherein:
the received data packets are network layer packets encapsulating packets at a higher layer than the network layer;
applying the classification rule to the received data packets includes applying a classification rule associated with characteristics of the received data at the network layer, thereby filtering packets that have higher layer characteristics not consistent with the network layer characteristics; and
processing the classification rule associated with characteristics of the received data packets and automatically applying the classification rule to the received data packets to determine at least one set of at least one destination queue associated with the host computer includes classifying the packets according to a network layer header and at least one header associated with the higher layer.

11. A method of operating network interface circuitry, wherein the network interface circuitry is configured to couple a host computer to a network to facilitate communication over the network between the host computer and a peer, the method comprising:
by the network interface circuitry,
receiving data from the peer via the network; and
processing the received data, including:
where there is a layer-2 classification rule associated with characteristics of the received data, automatically applying the classification rule to the received data; and
demultiplexing the received layer-2 packets according to destination queues associated with the host computer,
wherein the method further comprises:
applying to the received data a layer-3 classification rule associated with characteristics of the received data, thereby filtering ingress packets that have layer-2 characteristics not consistent with the layer-3 characteristics; and
applying to the received data a layer-4 classification rule associated with characteristics of the received data, thereby filtering ingress packets that have layer-2 and layer-3 characteristics not consistent with the layer-4 characteristics.

12. The method of claim 11, wherein:
separate sets of at least one destination queue are associated with separate one of a plurality of guest operating systems executing on the host computer.

13. The method of claim 11, wherein:
the host computer includes a plurality of processors;
the classification rule includes an indication of a particular one of the plurality of processors; and
demultiplexing the received data packet according to the separate destination queues associated with the host computer includes providing at least a portion of the received data to the indicated particular one of the plurality of processors.

14. The method of claim 11, wherein:
the layer-4 protocol is TCP and the received data includes a TCP SYN flag.

15. The method of claim 14, wherein:
the layer-4 classification rule is associated with at least the local TCP port number in the received data.

16. The method of claim 11, further comprising:
applying to the received data a VLAN classification rule associated with characteristics of the received data, thereby filtering ingress packets that have layer-2 characteristics, layer-3 characteristics and layer-4 characteristics that are not consistent with the VLAN characteristics.

* * * * *

UNITED STATES PATENT AND TRADEMARK OFFICE
CERTIFICATE OF CORRECTION

PATENT NO. : 7,660,306 B1 Page 1 of 1
APPLICATION NO. : 11/330898
DATED : February 9, 2010
INVENTOR(S) : Eiriksson et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 887 days.

Signed and Sealed this

Thirtieth Day of November, 2010

David J. Kappos
*Director of the United States Patent and Trademark Office*